Feb. 5, 1924.

W. H. SUTTON

MUD GUARD LIGHT

Filed Jan. 11, 1923

1,482,769

WITNESSES

Inventor
WILLIAM H. SUTTON
By
Richard B. Owen
Attorney

Patented Feb. 5, 1924.

1,482,769

UNITED STATES PATENT OFFICE.

WILLIAM H. SUTTON, OF EUGENE, OREGON.

MUD-GUARD LIGHT.

Application filed January 11, 1923. Serial No. 612,044.

*To all whom it may concern:*

Be it known that I, WILLIAM H. SUTTON, a citizen of the United States, residing at Eugene, in the county of Lane and State of Oregon, have invented certain new and useful Improvements in a Mud-Guard Light, of which the following is a specification.

This invention relates to automobile attachments and the primary object of the invention is to provide an improved light attachment for facilitating the passing of vehicles at night on a roadway, the light attachment being automatically turned on when the headlights are dimmed by the driver of the vehicle from the dashboard.

Another object of the invention is to provide a novel light attachment for facilitating the passing of vehicles at night on a roadway, which embodies a casing adapted to be connected with the left-hand running board or left-hand front wheel fender for containing electric light bulbs, and a novel reflector for projecting the light rays from the lamps laterally and rearwardly of the car with which the attachment is associated, thereby effectively illuminating the road for an oncoming vehicle and thus effectively preventing collisions between the passing vehicles and the striking of objects in the road by the vehicles.

A further object of the invention is to provide novel means for connecting the light casing to the fender or running board, so that the same can be adjusted to permit the best results to be had from the light attachment.

A further object of the invention is to provide means for preventing the throwing or projecting of the light rays upward, thereby effectively preventing the blinding of the driver of the vehicle with which the light is associated.

A still further object of the invention is to provide a novel attachment for motor vehicles of the above character, which will be durable and efficient in use, one will be simple and easy to manufacture, and one which can be placed upon the market and incorporated with a motor vehicle at a minimum cost.

With these and other objects in view the invention consists in the novel construction, arrangement and formation of parts, as will be hereinafter more specifically described, claimed and illustrated in the accompanying drawings, forming a part of this specification, in which drawings:

Referring to the drawings in detail, wherein similar reference characters designate corresponding parts throughout the several views, the letter A generally indicates a motor vehicle and B the novel light attachment therefor.

Figure 1:
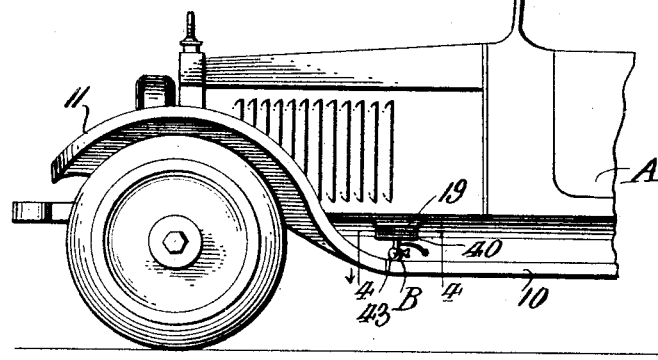
Figure 1 is a fragmentary side elevation of a motor vehicle showing the improved light attachment incorporated therewith.
Figure 2:
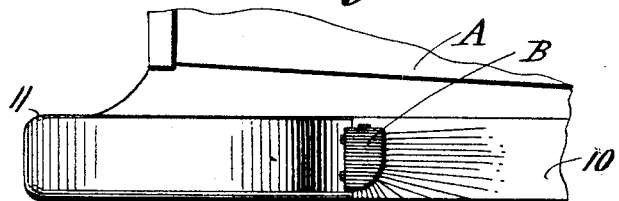
Figure 2 is a fragmentary plan view of a motor vehicle showing the attachment incorporated therewith.
Figure 3:
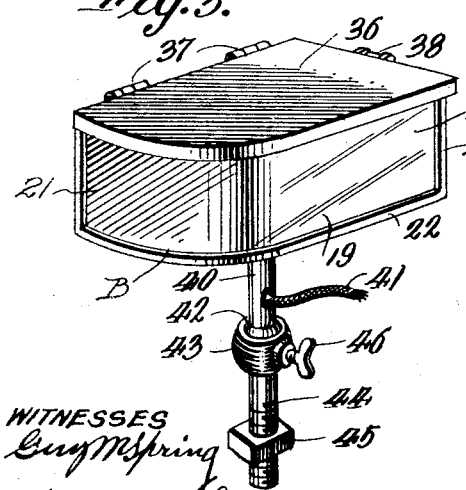
Figure 3 is a detail perspective view of the improved attachment prior to the connection therewith with a motor vehicle.
Figure 4:
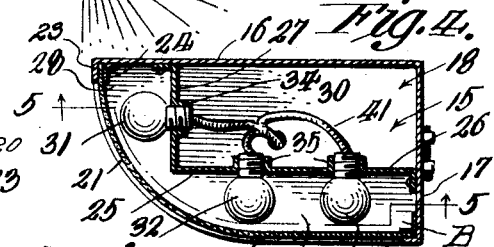
Figure 4 is a horizontal section through the improved attachment taken on the line 4—4 of Figure 1.
Figure 5:
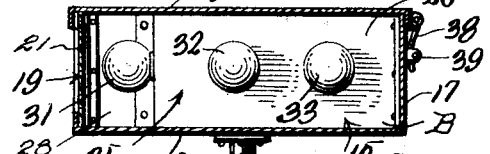
Figure 5 is a vertical section through the attachment taken on the line 5—5 of Figure 4.

The motor vehicle A can of course be of any preferred type or make and has been merely shown to illustrate the use of the improved invention and as shown, the automobile A includes the usual left-hand running board 10 and the left-hand front wheel fender or mud guard 11.

The improved attachment B, as stated, is primarily intended to throw a light laterally and rearwardly of the vehicle with which it is associated, so that the roadway will be effectively illuminated for permitting the safe passage of an oncoming vehicle past the vehicle, with which the light attachment is connected.

The light attachment B to bring about the desired results. can either be attached to a running board 10 or to the fender 11, and as shown in the drawings by way of example, the light attachment B is connected with the running board 10 adjacent to the point of connection of the fender 11 therewith.

The improved attachment B comprises a casing 15 including an opaque front or side wall 16 and a right angularly disposed inner or end wall 17, and a bottom wall 18. This bottom wall 18 has its outer edge gradually curved toward the front or end wall 16. A transparent plate 19 is provided for the rear or end wall 20 and for the outer wall 21, and as shown this transparent plate 19 is curved to conform to the curvature of the bottom wall 18 and that the walls 20 and 21 are in the nature of a continuous sheet. The bottom wall 18 can be provided with an upstanding flange 22 for receiving the plate 19 and the outer edges of the walls 16 and 17 are also provided with inturned flanges 23 for engaging the plate 19 and as shown suitable cleats 24 can be utilized for holding the plate in position. A substantially L-shaped reflector 25 is disposed within the casing 15 and includes a relatively long portion 26 which is disposed in substantial parallel relation to the portion 20 of the transparent plate 19 and a relatively short right angularly disposed portion 27 which is arranged inwardly of the curved wall or portion 21 of the transparent plate 19 and this L-shaped reflector 25 defines a lateral light compartment 28 and a relatively long rear compartment 29. The L-shaped reflector 25 besides defining the laterally extending light compartment 28 and the rear light compartment 29 defines an inner compartment 30 for the wires of the electric lamps 31, 32 and 33. As shown the relatively short portion 27 of the L-shaped reflector 25 is provided with a socket 34 for the lamp 31 while the relatively long portion 26 of the reflector is provided with a pair of sockets 35 for the lamps 32 and 33, and thus it can be seen that one lamp is arranged in the lateral light compartment 28 and two lamps are arranged in the rear light compartment 29.

A cover 36 is provided for the top of the casing 15 and this top conforms to the configuration of the lower wall 18 and is connected at its forward end by means of hinges 37 with the forward or end wall 16. This cover forms the dual function of preventing the light rays from being casted upward and for forming a closure for the casing. This cover 36 can be maintained in its closed position in any preferred way and by way of example, the cover, as shown carries a pivoted resilient latch 38, which is adapted to engage in a suitable keeper 39 carried by the inner wall 17.

As shown the lower wall 18 of the casing 15 carries a depending hollow stud 40 through which project the wires 41 for the lamps and these wires can be connected with the dimmer switch for the headlights in any preferred way, so that these lights will be turned on, when the headlights are dimmed. As shown the lower end of the stud 40 is provided with a ball head 42 for fitting in a suitable socket 43 carried by the attaching post 44, which as shown in the drawings is extended through the running board 10 and this post is threaded for the reception of a suitable nut 45 which can be utilized for clamping the post in position.

By this construction it can be seen that the casing 15 is swivelly mounted on the post 44 and a set screw 46 is provided for holding the casing in any preferred adjusted position on the post 44.

In use of the improved device, it can be seen that when the headlights are dimmed, the lamps 31, 32, and 33 will be turned on, which, owing to the reflector 25 will project the rays of light outward of the casing 15 laterally of the vehicle and rearwardly thereof, thus effectively illuminating the roadway and permitting the safe passage of vehicles past each other.

Changes in details may be made without departing from the spirit or the scope of this invention but what I claim as new is:

1. A light attachment for motor vehicles for casting rays of lights laterally and rearwardly of a motor vehicle including a casing, having transparent side and rear walls, an L-shaped reflector in the casing, electric lamps carried by the L-shaped reflector, and a pivoted opaque cover for the casing for preventing the casting of light rays upwardly.

2. An attachment for motor vehicles for casting light rays laterally and rearwardly of a vehicle comprising a casing, having a transparent outer side wall and a transparent rear wall, an L-shaped reflector in said housing, electric lamps carried by the reflector, and adjustable means for connecting the housing to a vehicle.

In testimony whereof I affix my signature in presence of two witnesses.

WILLIAM H. SUTTON.

Witnesses:
 JESSE G. WELLS,
 HAROLD J. WELLS.